United States Patent
Fukuda et al.

(10) Patent No.: US 11,254,110 B2
(45) Date of Patent: Feb. 22, 2022

(54) POLYIMIDE RESIN FILM, ENDLESS BELT, AND IMAGE FORMING APPARATUS

(71) Applicant: FUJIFILM Business Innovation Corp., Tokyo (JP)

(72) Inventors: Shigeru Fukuda, Kanagawa (JP); Futoshi Takei, Kanagawa (JP); Satoya Sugiura, Kanagawa (JP); Masato Furukawa, Kanagawa (JP); Hiroaki Tanaka, Kanagawa (JP); Masato Ono, Kanagawa (JP)

(73) Assignee: FUJIFILM Business Innovation Corp., Tokyo ( * ) Notice: Subject to any disclaimer, the term of this patent is extended or adjusted under 35 U.S.C. 154(b) by 105 days.

(21) Appl. No.: 16/718,556

(22) Filed: Dec. 18, 2019

(65) Prior Publication Data

US 2020/0325333 A1    Oct. 15, 2020

(30) Foreign Application Priority Data

Apr. 11, 2019 (JP) .............................. JP2019-075358

(51) Int. Cl.
*B32B 27/28* (2006.01)
*G03G 15/16* (2006.01)

(52) U.S. Cl.
CPC .......... *B32B 27/281* (2013.01); *G03G 15/162* (2013.01); *G03G 15/1685* (2013.01); *B32B 2264/108* (2013.01); *B32B 2433/00* (2013.01); *G03G 2215/1623* (2013.01)

(58) Field of Classification Search
CPC ... C08L 79/08; B32B 27/281; B32B 2433/00; B32B 2264/108; G03G 15/0131; G03G 15/0189; G03G 2215/1623; G03G 15/1685; G03G 15/162; C08G 73/14
See application file for complete search history.

(56) References Cited

U.S. PATENT DOCUMENTS

2013/0037304 A1*   2/2013   Ikeda ..................... H01B 3/30
                                                          174/119 C

FOREIGN PATENT DOCUMENTS

| JP | 03-052936 A | 3/1991 |
| JP | 07-156287 A | 6/1995 |
| JP | 3586507 B2 | 11/2004 |
| JP | 2007-182503 A | 7/2007 |

OTHER PUBLICATIONS

Sener, Ugur, "Adhesion of copper to UV photo-oxidized Kapton and Upilex-S polyimide surfaces" (2004). Thesis. Rochester Institute of Technology. Accessed from https://scholarworks.rit.edu/theses/7648 (Year: 2004).*

* cited by examiner

*Primary Examiner* — John D Freeman
(74) *Attorney, Agent, or Firm* — Sughrue Mion, PLLC (57) ABSTRACT

A polyimide resin film includes: a first layer that contains an imide resin, a bond composition ratio of a sum of a C—N bond and a C—O bond to bonds of all C elements that are present in a surface of the first layer being 4 atm % or more; and a second layer that is provided on the surface of the first layer.

7 Claims, 1 Drawing Sheet

POLYIMIDE RESIN FILM, ENDLESS BELT, AND IMAGE FORMING APPARATUS

CROSS-REFERENCE TO RELATED APPLICATIONS

This application is based on and claims priority under 35 USC 119 from Japanese Patent Application No. 2019-075358 filed Apr. 11, 2019.

BACKGROUND

(i) Technical Field

The present invention relates to a polyimide resin film, an endless belt, and an image forming apparatus.

(ii) Related Art

Polyimide has been used in a variety of industrial fields as various films, molded articles, and the like due to excellent heat resistance, mechanical strength, electric properties, and chemical resistance. However, since polyimide is typically inert, it is not possible to state that wettability thereof is satisfactory, and there is a trend that adhesion properties with respect to other materials are not satisfactory. In a case in which a film of multilayered polyimide resin layers is obtained, in terms of a problem in adhesion between the polyimide-based layers, the multilayered film is obtained, for example, by applying the polyimide resin layers in a precursor dried state in a superimposed manner (see JP-A-7-156287). However, since a surface on the dried state side is eroded with a solvent at an interface although excellent adhesiveness between the layers is achieved in the case where the polyimide resin layers being in the precursor state are applied in a superimposed manner, in, the case where the film is applied to a belt, aggregation of a conductive material occurs, and variation in resistance increases. Therefore, an improvement in adhesiveness is attempted by performing a chemical or physical treatment on the polyimide resin layers.

For example, JP-A-3-52936 discloses "a surface improving method in which a surface of a polyimide molded article is irradiated with ultraviolet region laser light having a wavelength of 400 nm or less".

JP-A-2007-182503 discloses "a method of preparing a film having an improved surface, in which a surface of a film to be treated is irradiated with an ultraviolet ray having a main peak within a wavelength range of 120 to 260 nm".

JP-B-3586507 discloses "a method for improving a surface of a polyimide resin, in which the surface of the polyimide resin is subjected to a photochemical reaction treatment by bringing the polyimide resin into contact with an aqueous solution of hydrogen peroxide, then bringing the polyimide resin into contact with an aqueous solution of an iron salt while irradiating the polyimide resin with an ultraviolet ray, and the surface after being subjected to the photochemical reaction treatment is then etched with a salt of permanganic acid, thereby forming an uneven surface.

SUMMARY

For a polyimide resin film, a further improvement has been required in order to enhance adhesiveness of layers including an imide resin. Aspects of non-limiting embodiments of the present disclosure relate to provide a polyimide resin film including: a first layer that contains an imide resin; and a second layer that is provided on a surface of the first layer, in which adhesiveness of the second layer to the first layer is improved as compared with a case in which a bond composition ratio of a sum of a C—N bond and a C—O bond to a bond of all C elements that are present in the surface of the first layer is less than 4 atm %.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a polyimide resin film including:

a first layer that contains an imide resin, a bond composition ratio of a sum of a C—N bond and a C—O bond to bonds of all C elements that are present in a surface of the first layer being 4 atm % or more; and a second layer that is provided on the surface of the first layer.

BRIEF DESCRIPTION OF THE DRAWINGS

Exemplary embodiments of the present invention will be described in detail based on the following FIGURES, wherein.

DETAILED DESCRIPTION

Hereinafter, a polyimide resin film according to an exemplary embodiment of the invention will be described in detail.

The polyimide resin film according to the embodiment has: a first layer that contains an imide resin, a bond composition ratio of a sum of a C—N bond and a C—O bond to the bonds of all the C elements that are present in a surface of the first layer being 4 atm % or more, and a second layer that is provided on the surface of the first layer Here, in regard to the aforementioned constitutional requirement that "the bond composition ratio of a sum of the C—N bond and the C—O bond to the bonds of all the C elements that are present in the surface of the first layer being 4 atm % or more", it is only necessary for at least the surface of the first layer on the interface side between the first layer and the second layer to satisfy the constitutional requirement. Also, the layer configuration, of the polyimide resin film is not limited thereto and may further include other layers in the embodiment.

The polyimide resin film according to the embodiment has improved adhesiveness of the second layer with respect to the first layer according to the aforementioned configuration. The reason thereof is estimated as follows though it is not sure.

Since an imide resin is typically an inert resin, a layer containing the imide resin originally tends to have non-satisfactory adhesiveness to the other layer. Therefore, with respect to a polyimide resin film in which a second layer is laminated on a first layer containing the imide resin, a peeling phenomenon is observed at an interface between the first layer and the second layer in some cases. Therefore, it is conceivable to improve adhesiveness to the second layer by additionally providing a functional layer such as an adhesive layer between the first layer and the second layer or performing a sandblasting treatment on the surface of the first layer. Meanwhile, the polyimide resin film according to the embodiment has a configuration in which a bond composition ratio of a sum of a C—N bond and a C—O bond to bonds of all C elements that are present in at least a surface of the first layer containing the imide resin on a side on which the second layer is provided is 4 atm % or more. That is, since the surface of the first layer on which the second layer is provided has the highly reactive C—O bond at a high proportion, affinity with the second layer is considered to be high. Also, the aforementioned configuration of the polyimide resin film according to the embodiment is obtained by performing a surface improving treatment (for example, ultraviolet ray irradiation) on the first layer after imide conversion and then removing a degraded imide resin. Specifically; it is considered to be possible to increase the proportion of a —COOH group, an —OH group, and a —CN group that are polar groups that contribute to adhesion and are present in the first layer by removing, from the surface of the first layer, the degraded imide resin that are present in the first layer subjected to the surface improving treatment (for example, ultraviolet ray treatment), that is, bonding locations that have been unnecessarily cut in the previous ultraviolet treatment. Therefore, since neither the special process for additionally providing the functional layer nor the treatment such as sandblasting that may degrade surface properties of the first layer as described above are required for the polyimide resin film according to the embodiment, it is possible to prevent degradation of functions of the first layer and also to improve adhesiveness to the second layer. Therefore, the polyimide resin film according to the embodiment has improved adhesiveness of the second layer to the first layer according to the aforementioned configuration. In addition, the polyimide resin film according to the embodiment is preferably used as a belt generally used in a copy machine, for example, as a transport belt such as a direct transfer belt or an intermediate transfer belt.

[First Layer]

The first layer in the polyimide resin film according to the embodiment contains an imide resin. Here, the imide resin means a resin containing a constitutional unit having an imide bond. The type of the imide resin is not particularly limited, examples of the imide resin include a thermosetting polyimide resin and a polyamide-imide resin, and one kind thereof may be used alone, or two or more kinds may be used in combination.

Also, the first layer may contain additives, which will be described later, in addition to the aforementioned resin to such an extent that properties of the imide resin contained in the first layer are not degraded. In such a case, a total proportion of the resin component in the first layer is preferably 50% by weight or more, is more preferably 60% by weight or more, and is further preferably 70% by weight or more with respect to the entire amount of the first layer.

(Polyimide Resin)

Examples of the polyimide resin include an imidized product of polyamic acid (a precursor of the polyimide resin) that is a polymer of a tetracarboxylic dianhydride and a diamine compound. Specific examples of the polyimide resin include a product obtained by performing a polymerization reaction of tetracarboxylic dianhydride and diamine compound in equimolar amounts in a solvent to obtain a solution of polyamic acid and then imidizing the polyamic acid.

Examples of the polyimide resin include a resin having a constitutional unit represented by Formula (I) below.

Formula (I)

(In Formula (I), $R^1$ represents a quaternary organic group and is an aromatic group, an aliphatic group, a cyclic aliphatic group, a group including an aromatic group and an aliphatic group in combination, or a substituted group thereof (for example, a residue of tetracarboxylic dianhydride, which will be described later), $R^2$ represents a bivalent organic group and is an, aromatic group, an aliphatic group, a cyclic aliphatic group, a group including an aromatic group and an aliphatic group in combination, or a substituted group thereof (for example, a residue of a diamine compound, which will be described later).)

Specific examples of the tetracarboxylic dianhydride include pyromellitic dianhydride, 3,3',4,4'-benzophenonetetracarboxylic dianhydride, 3,3',4,4'-biphenyltetracarboxylic dianhydride, 2,3,3',4-biphenyltetracarboxilic dianhydride, 2,3,6,7-naphthalenetetraearboxylic dianhydride, 1,2,5,6-naphthalenetetracarboxylic dianhydride, 1,4,5,8-naphthalenetetracarboxyic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracuboxylic dianhydride.

Meanwhile, specific examples of the diamine compound include 4,4'-diamitiodiphenylether, 4,4'-diamnodiphenylmethane, 3,3'-diamiodphenylmethane, 3,3'-dichlorobenzidine, 4,4'-aminodiphenylsulfide, 3'-diaminodiphenylsulfone, 1,5-diaminonaphthalene, m-phenylenediamine, p-phenylenediamine, 3,3'-dimethyl4,4'-biphenyldiamine, benzidine, 3,3'-dimethylbenzidine, 3,3'-dimethoxybenzidine, 4,4'-diaminodiphensulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediame, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminoproboxyethane, 2,2-dimethylpropylenediamine, 3-methoxyhexamethylenedamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

(Polyamide-Imide Resin)

Examples of the polyamide-imide resin include a polymer of trivalent, carboxylic acid (tricarboxylic acid) having an acid anhydride group, and isocyanate or diamine.

Tricarboxylic acid is preferably trimellitic anhydride or a derivative thereof. In addition to the tricarboxylic acid, tetracarboxylic dianhydride, aliphatic dicarboxylic acid, aromatic dicarboxylic acid, or the like may be used in combination.

Examples of isocyanate include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbipbenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate. Examples of diamine include a compound that has a structure similar to that of isocyanate as described above and that has an amino group instead of an isocyanato group.

In the first layer in the polyimide resin film according to the embodiment, the bond, composition ratio of a sum of the C—N bond and the C—O bond to the bonds of all the C elements that are present in the surface of the first layer is 4 atm % or more. In terms of an improvement in adhesiveness of the second layer to the first layer, the bond composition ratio is preferably 4.5 atm % or more and is more preferably 5 atm % or more. Also, an upper limit value of the bond composition ratio is not particularly limited.

The bond composition ratio of a sum of the C—N bond and the C—O bond to the bonds of all the C elements that are present in the surface of the first layer may be measured using an X-ray photoelectron spectrometer (XPS) and is measured by the following method. Elements N, elements C, and elements O are evaluated at every 150 nm from the surface of the first layer toward the center of the first layer up to the depth of 600 nm using an XPS element analyzer, and a ratio of a sum of the C—N bond and the C—O bond to the elements C contained in the first layer is assumed to be a "bond composition ratio (atm %)".

Measurement conditions are as follows similarly to examples, which will be described later.
  Analyzer: JPS-9000MX manufactured by JEOL Ltd.
  X-ray source: MgKα ray
  Acceleration voltage: 10 kV
  Emission current: 30 mA:

Also, for discriminating elements C and elements O derived from the resin component contained in the first layer from elements C and elements O contained in components (various additives and the like) other than the resin component, it is possible to make the discrimination through peak separation of measured element analysis results

[Second Layer]

The second layer in the polyimide resin film according to the embodiment is provided on the surface of the first layer. Although the second layer may be an inorganic layer or a resin layer (that is, a layer containing a resin as a primary component), the second layer is preferably a resin layer.

(Inorganic Layer)

In a case in which the second layer is an inorganic layer, the inorganic layer is not particularly limited but preferably contains metal or a silicon compound. Examples of the metal include nickel, copper, and zinc. Also, in a case in which the inorganic layer contains metal, the inorganic layer is formed through metal plating working, for example. As a method for the metal plating working, any method in which the surface of the first layer is plated with metal may be used, examples thereof include electroless nickel plating, electroless copper plating, and electroless ring plating, and electroless nickel-phosphorous plating is particularly preferable in the electroless nickel plating.

Examples of the silicon compound include polysilazane, silicon, and silane. The polysilazane is a polymer compound having —$SiH_2$—NH— as a basic unit, and may form a silica film containing silicon oxide as a primary component. Also, in a case in which the inorganic layer contains the silicon compound, the inorganic layer is formed through coating using a known coating agent, for example. Examples of the coating agent include an inorganic silazane coating agent (manufactured by AZ Electronic Materials).

In a case in which the second layer is a resin layer, the second layer is preferably a resin layer containing an imide resin. Also, details of the imide resin contained in the second layer are the same as those for the imide resin, which have already been described above. Hereinafter, details of the resin are the same as the above description unless otherwise particularly indicated.

Also, in the case in which the second layer is the resin layer, the second layer may contain additives, which will be described later, in addition to the aforementioned resin to such an extent that properties of the imide resin contained in the second layer are not degraded. Ire such a case, the total proportion of the resin component in the second layer is preferably 50% by weight or more, is more preferably 60% by weight or more, and is further preferably 70% by weight or more with respect to the entire amount of the second layer.

[Additives]

The first layer and the second layer that form the polyimide resin film in the embodiment may contain the following additives.

(Conductive Material)

The polyimide resin film according to the embodiment may contain a conductive material for imparting conductive properties. Examples of the conductive material include conductive (for example, volume resistance is less than $10^7$ Ω·cm, the same applies to the following description) or semiconductor (for example, a volume resistance is $10^7$ Ω·cm or more and $10^{14}$ Ω·cm or less, the same applies to the following description) powder (powder of particles with primary particle diameters of less than 10 μm, and preferably powder of particles with primary particle diameters of 1 μm or less). Although the conductive material is not particularly limited, examples thereof include carbon black (for example, Ketjenblack, acetylene black, carbon black with a surface alter being subjected to an oxidation treatment, and the like), metal (for example, aluminum, nickel, and the like), metal oxide (for example, yttrium oxide, tin oxide, and the like), ion conductive substances (for example, potassium titanate, LiCl, or the like), and the like.

The conductive material is selected depending on a purpose of utilization, carbon black is preferably used, and in particular, carbon black subjected to an oxidation treatment (for example, carbon black obtained by applying a carboxyl group, a quinone group, a lactone group, a hydroxyl group, or the like to the surface thereof) and having a pH of 5 or less (preferably pH 4.5 or less or more preferably pH 4.0 or less) in terms of stability of electric resistance with time and field dependency that prevents electric field concentration which may be caused by a transfer voltage.

An average primary particle diameter of the carbon black is preferably 10 nm or more and 50 nm or less and is more preferably 15 nm or more and 30 nm or less. The average primary particle diameter of the carbon black is measured by the following method. First, an endless belt as a target of measurement is cut with a microtome, a measurement sample having a thickness of 100 nm is taken out, and the measurement sample is observed with a transmission electron microscope (TEM). Then, the diameter of a circle that has an area equal to the projection area of each of fifty particles of the carbon black is taken as a particle diameter, and an average value of the diameters is assumed to be the average primary particle diameter.

Although the content of the conductive material is selected depending on a target resistance, and for example, the content is preferably 1% by weight or more and 50% by weight: or less, is more preferably 2% by weight or more and 40% by weight or less, and is further preferably 4% by weight or more an 30% by weight or less with respect to the total weight of the first layer or the second layer in the polyimide resin film. One kind of conductive material may be used alone, or two or more kinds of conductive material may be used in combination.

—Other Additives

Examples of additives other than the conductive material include a dispersant for improving dispersibility of the carbon black, various fillers for applying various functions such as mechanical strength, a catalyst for promoting an imidization reaction, a leveling agent for improving quality of film formation, mold releasing materials for improving mold releasability (for example, fluorine resin particles such as PTFE, PEA, and FEP), and the like.

(Thickness Ratio)

In the polyimide resin film according to the embodiment, a ratio between the thickness of the first layer and the thickness of the second layer is preferably from 40:60 to 60:40 and is more preferably from 45:55 to 55:45 in terms of maintenance of adhesiveness of the second layer to the first layer in utilization with time.

The thickness of the polyimide resin film according to the embodiment may adjusted depending on a purpose, and the thickness thereof is preferably 50 μm or more and 200 μm or less and is more preferably 60 μm or more and 150 μm or less. Also, the thickness of each layer included in the polyimide resin film may be measured using an eddy current-type film thickness measuring isoscope FMP10 manufactured by Fischer Instruments K.K. In the embodiment, measurement is performed at twelve locations (three locations at equal intervals in the axial direction of the polyimide resin film×four locations at equal intervals in the circumferential direction of the polyimide resin film), and an average value thereof is assumed to be an average thickness.

<Application of Polyimide Resin Film>

First, examples of application of the polyimide resin film according to the embodiment include an endless belt in an image forming apparatus. Specifically, the polyimide resin film is applied to a belt member for a transfer unit (for example, an intermediate transfer belt, a recording medium transport belt, a primary transfer belt, and a secondary transfer belt), and a bell member for a charging unit (for example, a charging belt). Also, the polyimide resin film may be used as a roll member (a roll member for a transfer unit or a roll member for a charging unit) by covering a roll such as a metal roll or a resin roll with the polyimide resin film.

In addition to the endless belt for the image forming apparatus, the polyimide resin film according to the embodiment may also be used in a cylindrical solar battery base material. In addition, the polyimide resin film according to the embodiment may also be used to a transport belt, a drive belt, a laminate belt, an electric insulating material, a pipe covering material, an electromagnetic wave insulating material, a heat source insulating member, an electromagnetic wave absorbing film, or the like.

The intermediate transfer belt (that is, the endless belt) included in the image forming apparatus according to the embodiment is a belt, which is made of the polyimide resin film according to the embodiment, in which the polyimide resin film according to the embodiment is used as a base material and the other layer is further laminated on at least one of an outer circumferential surface side and an inner circumferential surface side. For example, a configuration in which an elastic layer (for example, a silicone rubber layer), a surface layer (for example, a fluorine-containing resin layer), and the like are provided on the outer circumferential surface side of the polyimide resin film according to the embodiment that serves as a base material may also be employed.

[Image Forming Apparatus]

Next, an image forming apparatus according to the embodiment will be described. The image forming apparatus according to the embodiment includes an image holding member, a toner image forming unit that forms a toner image on a surface of the image holding boy, a transfer unit, and a transfer unit that transfers the toner image onto a surface of a recording medium.

For example, there is exemplified a configuration in which the image forming apparatus includes an image holding member, a charging unit that charges the surface of the image holding member, an electrostatic latent image forming unit that forms an electrostatic latent image on the surface of the charged image holding member, a developing unit that develops the electrostatic latent image formed on the surface of the image holding member with a developer containing a toner to form a toner image, a transfer unit that transfers the toner image onto the surface of the recording medium, and a fixing unit that fixes the toner image on the recording medium, and the polyimide resin film according to the embodiment is applied to the image forming apparatus as a belt member or a roll member for the transfer unit.

Figure 1:
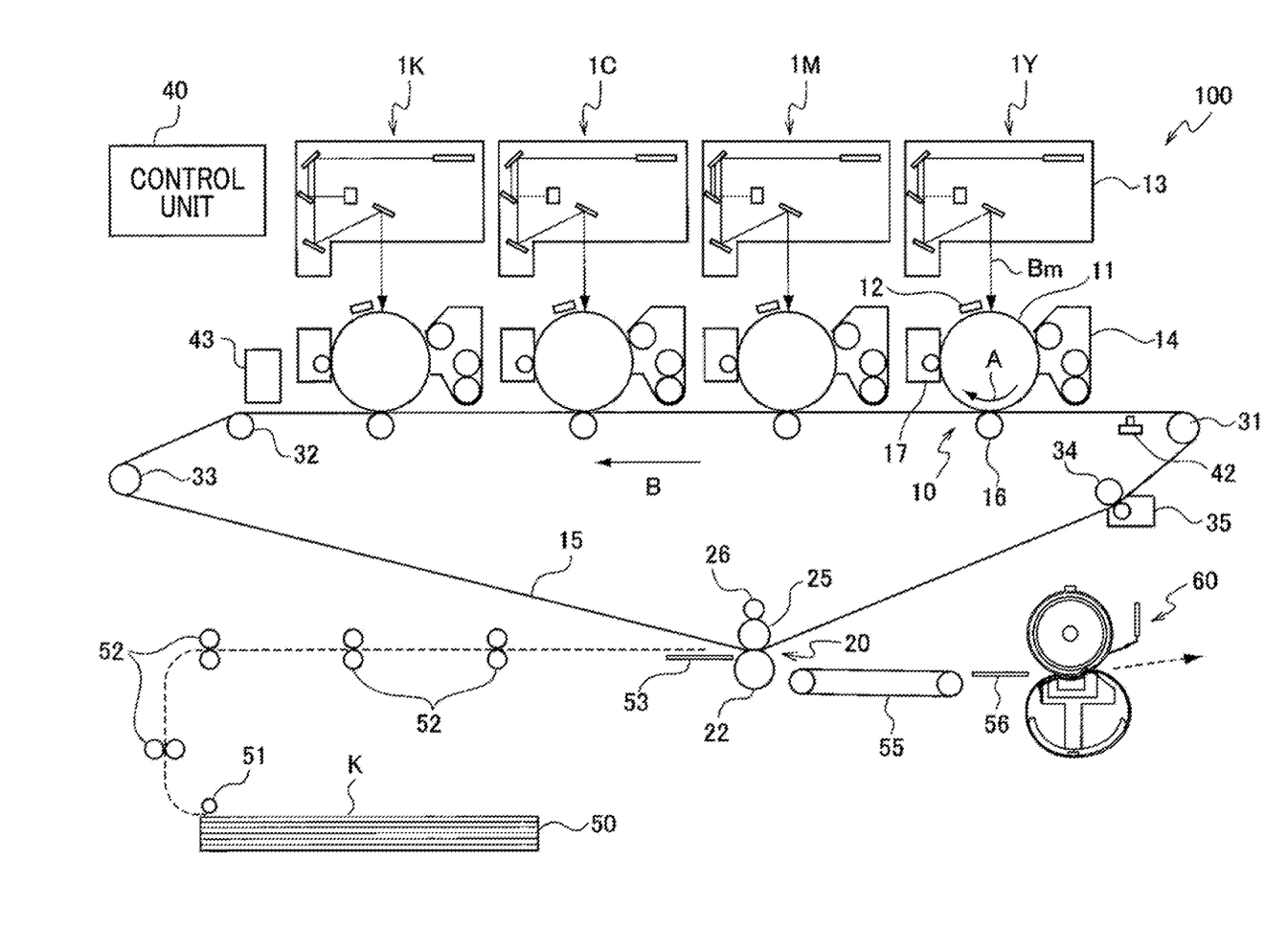
FIG. 1 is an outline configuration diagram illustrating an example of an image forming apparatus according to an embodiment.

Hereinafter, the image forming apparatus according to the embodiment will be described with reference to drawings. FIG. 1 is an outline configuration diagram illustrating a configuration of the image forming apparatus according to the embodiment. Also, the endless belt according to the embodiment is applied as an intermediate transfer belt.

An image forming apparatus 100 according to the embodiment is an image forming apparatus based on an intermediate transfer method, which is typically called a tandem type, for example, as illustrated in FIG. 1 and includes plural image forming units 1Y, 1M, 1C, and 1K that form toner images of the respective color components by an electrophotographic system, a primary transfer unit 10 that sequentially transfer (primarily transfer) the respective color component toner images formed by the respective image forming units 1Y, 1M, 1C, and 1K onto an intermediate transfer belt 15, a secondary transfer unit 20 that collectively transfers (secondarily transfers) the superimposed toner image, which has been transferred onto the intermediate transfer belt 15, onto a sheet K that is a recording medium, and a fixing unit 60 that fixes the secondarily transferred image on the sheet K. Also, the image forming apparatus 100 has a control unit 40 that controls operations of the respective units (respective units).

Each of the image forming units 1Y, 1M, 1C, and 1K in the image forming apparatus 100 includes a photoreceptor 11 that rotates in the direction of the arrow A as an example of an image holding member that holds the toner image formed on the surface.

A charger 12 that charges the photoreceptor 11 as an example of the charging unit is provided, and a laser exposing unit 13 (in the drawing, an exposure beam is represented with a reference numeral Bm) that writes an electrostatic latent image on the photoreceptor as an example of the latent image forming unit is provided, in the circumference of the photoreceptor 11.

Also, a developer 14, in which the respective color component toners are contained, which visualizes the electrostatic latent image on the photoreceptor 11 using a toner, as an example of the developing unit is provided, and a primary transfer roll 16 that transfers the respective color component toner images formed on the photoreceptor 11 onto the intermediate transfer belt 15 using the primary transfer unit 10 is provided, in the circumference of the photoreceptor 11.

Further, a photoreceptor cleaner 17 that removes a remaining toner on the photoreceptor 11 is provided, and electrophotography units, namely the charger 12, the laser exposing unit 13, the developing unit 14, the primary transfer roll 16, the photoreceptor cleaner 17 are successively disposed in the rotation direction of the photoreceptor 11, in the circumference of the photoreceptor 11, These image forming units 1Y, 1M, 1C, and 1K are substantially linearly disposed in an order of yellow (Y), magenta (M), cyan (C), and black (K) from the upstream side of the intermediate transfer belt 15.

The intermediate transfer belt 15 that is an intermediate transfer member is formed to have a volume resistance of $1 \times 10^7$ Ωcm or more and $1 \times 10^{14}$ Ωcm or less, and the thickness thereof is about 0.1 mm, for example.

The intermediate transfer belt 15 is driven (rotated) in a circulated manner with various rolls at a speed in accordance with a purpose thereof in the B direction illustrated m FIG. 1. As the various rolls, a drive roll 31 that is driven by a motor (not illustrated) with excellent constant speed properties and causes the intermediate transfer belt 15 to rotate, a support roll 32 that supports the intermediate transfer belt 15 extending substantially linearly in an alignment direction of the respective photoreceptors 11, a tensile force application roll 33 that serves as a correction roll that applies a tensile force to the intermediate transfer belt 15 and prevents the intermediate transfer belt 15 from meandering, a rear surface roll 25 that is provided at the secondary transfer unit 20, and a cleaning rear surface roll 34 that is provided at the cleaning unit to wipe the toner remaining on the intermediate transfer belt 15 are included.

The primary transfer unit 10 is configured to include the primary transfer roll 16 that is disposed so as to face the photoreceptor 11 with the intermediate transfer belt 15 interposed therebetween. Also, the primary transfer roll 16 is disposed such that the primary transfer roll 16 is in pressure contact with the photoreceptor 11 with the intermediate transfer belt 15 interposed therebetween, and further, a voltage with a polarity that is opposite to the toner charging polarity this is assumed to be a negative polarity; the same applies to the following description) is applied to the primary transfer roll 16. In this manner, the toner images of the respective photoreceptors 11 are sequentially and electrostatically suctioned by the intermediate transfer belt 15, and a superimposed toner image is thus formed on the intermediate transfer belt 15.

The secondary transfer unit 20 is configured to include the rear surface roll 25 and the secondary transfer roll 22 that is disposed on a toner image holding surface side of the intermediate transfer belt 15.

The rear surface roll 25 is formed to have a surface resistance of $1 \times 10^7$ Ω/sq. or more and $1 \times 10^{10}$ Ω/sq. or less, and the hardness is set to 70° (ASKER C manufactured by Kobunshi Keiki Co., Ltd.; the same applies to the following description), for example. The rear surface roll 25 is disposed on the rear surface side of the intermediate transfer belt 15 and forms a facing electrode of the secondary transfer roll 22, and a power supply roll 26 made of metal to which a secondary transfer bias is stably applied is disposed in a contact manner.

Meanwhile, the secondary transfer roll 22 is a cylindrical roll with a volume resistance of $10^{7.5}$ Ωcm or more and $10^{8.5}$ Ωcm or less. In addition, the secondary transfer roll 22 is disposed such that the second transfer roll 22 is in pressure contact with the rear surface roll 25 with the intermediate transfer belt 15 interposed therebetween, further, the second transfer roll 22 is grounded, a secondary transfer bias is formed with the rear surface 25, and a toner image is secondarily transferred to the sheet K transported to the secondary transfer unit 20.

Also, an intermediate transfer belt cleaner that removes the remaining toner and paper powder on the intermediate transfer belt 15 after the secondary transfer and cleans the surface of the intermediate transfer belt 15 is provided on the downstream side of the secondary transfer unit 20 of the intermediate transfer belt 15 such that the intermediate transfer belt cleaner 35 may freely be brought into contact therewith and be separate therefrom.

Also, the intermediate transfer belt 15, the primary transfer unit 10 (primary transfer roll 16), and the secondary transfer unit 20 (secondary transfer roll 22) correspond to one example of the transfer unit.

Meanwhile, a reference sensor (home position sensor) 42 that serves as a reference for choosing image forming timing of the respective image forming units 1Y, 1M, 1C, and 1K is disposed on the upstream side of the yellow image forming unit 1Y. Also, an image concentration sensor 43 for adjusting image quality is disposed on the downstream side of the black image forming, unit 1K. The reference sensor 42 recognizes a mark provide on the back side of the intermediate transfer belt 15 and generates a reference signal, and the respective image forming units 1Y, 1M, 1C, and 1K are configured to start image formation in response to an instruction from the control unit 40 on the basis of recognition of the reference signal.

Further, the image forming apparatus according to the embodiment includes a sheet containing unit 50 that serves as a transport unit for transporting the sheet K and contains the sheet K a sheet supply roll 51 that takes and transports the sheet K stacked in the sheet containing unit 50 at a predetermined timing, a transport roll 52 that transports the sheet K fed by the sheet supply roll 51, a transport guide 53 that sends the sheet K transported by the transport roll 52 to the secondary transfer unit 20, a transport belt 55 that transports the sheet K that is transported after secondary transfer is performed there cm by the secondary transfer roll 22 to the fixing unit 60, and a fixing inlet guide 56 that guides the sheet K to the fixing unit 60.

Next, a basic image creation process of the image forming apparatus according to the embodiment will be described. In the image forming apparatus according to the embodiment, image data output from an image reading reader, which is not illustrated in the drawing, a personal computer (PC), which is not illustrated in the drawing, or the like is subjected to image processing by an image processing system, which is not illustrated in the drawing, and image creating operations are executed thereon by the image forming units 1Y, 1M, 1C, and 1K.

In the image processing system, image processing including various kinds of image editing and the like such as shading correction, positional deviation correction, brightness/color space conversion, gamma correction, frame deletion and color editing, and motion editing is perfumed on reflectance data input. The image data after being subjected to the image processing is converted into color material gradation data of four colors Y M, C, and K and is then output to the laser exposing unit 13.

In the laser exposing unit 13, the respective photoreceptors 11 of the image forming units 1Y, 1M, 1C, and 1K are irradiated with the exposure beam Bin emitted from a semiconductor laser, for example, in accordance with the color material gradation data input. The surfaces of the respective photoreceptors 11 of the image forming units 1Y, 1M, 1C, and 1K are charged by the charger 12 and are subjected to scanning exposure by the laser exposing unit 13, thereby forming electrostatic latent images. The formed electrostatic latent images are developed as toner images of the respective colors Y, M, C, and K by the respective image forming units 1Y, 1M, 1C, and 1K.

The toner images formed on the photoreceptors 11 of the image forming units 1Y, 1M, 1C, and 1K are transferred onto the intermediate transfer belt 15 by the primary transfer unit 10 at which the respective photoreceptors 11 and the intermediate transfer belt 15 are brought into contact with each other. More specifically, a voltage (primary transfer bias) with a polarity that is opposite to the charging polarity (negative polarity) of the toners is applied to the base material of the intermediate transfer belt 15 by the primary transfer roll 16, and the toner images are primarily transferred to the surface of the intermediate transfer belt 15 in a sequentially superimposed manner, at the primary transfer unit 10.

After the toner images are primarily transferred in a sequential manner on the surface of the intermediate transfer bell 15, the intermediate transfer belt 15 moves, and the toner images are transported to the secondary transfer unit 20. If the toner images are transported to the secondary transfer unit 20, the sheet supply roll 51 rotates at a timing at which the toner images are transported to the secondary transfer unit 20, and the sheet K with a target size is supplied from the sheet containing unit 50, at the transport unit. The sheet K supplied by the sheet supply roll 51 is transported by the transport roll 52 and reaches the secondary transfer unit 20 via the transport guide 53. Before the sheet K reaches the secondary transfer unit 20, the sheet K is once stopped, and positioning between the position of the sheet K and the position of the toner images is performed by a positioning roll (not illustrated) rotating at a moving timing of the intermediate transfer belt 15 on which the toner images are held.

At the secondary transfer unit 20, the secondary transfer roll 22 is pressurized against the rear surface roll 25 via the intermediate transfer belt 15. At this time, the sheet K transported at an adjusted timing is sandwiched between the intermediate transfer belt 15 and the secondary transfer roll 22. Then, if a voltage (secondary transfer bias) with the same polarity as the charging polarity (negative polarity) of the toner is applied from a power supply roll 26, a transfer field is formed between the secondary transfer roll 22 and the rear surface roll 25. Then, the unfixed toner images held on the intermediate transfer belt 15 are electrostatically transferred in a collective manner onto the sheet K at the secondary transfer unit 20 that is pressurized by the secondary transfer roll 22 and the rear surface roll 25.

Thereafter, the sheet K with the toner images electrostatically transferred thereon is directly transported in a state in which the sheet. K is caused to peel off from the intermediate transfer belt 15 by the secondary transfer roll 22 and is then transported to the transport belt 55 provided on the downstream side of the secondary transfer roll 22 in the sheet transport direction. The transport belt 55 transports the sheet K up to the fixing unit 60 at an optimal transport speed for the fixing unit 60. The unfixed toner image on the sheet K transported to the fixing unit 60 is fixed on the sheet K by being subjected to a fixing treatment with heat and a pressure by the fixing unit 60. Then, the sheet K with the fixed image formed thereon is transported to a discharged sheet containing unit (not illustrated) provided at a discharging unit of the image forming apparatus.

Meanwhile, the toner remaining in the intermediate transfer belt 15 after the transferring onto the sheet K ends is transported up to the cleaning unit with the rotation of the intermediate transfer belt 15 and is removed from the intermediate transfer belt 15 by the cleaning rear surface roll 34 and the intermediate transfer belt cleaner 35.

<Method of Preparing Polyimide Resin Film>

Next, a method of preparing the polyimide resin film according to the embodiment will be described referring to a case in which the second layer is a resin layer. Although the method of preparing the polyimide resin film according to the embodiment preferably has the following processes 1) to 7), the method is not limited to the following method. 1) a process of forming a coating film by applying a coating solution (hereinafter, also referred to as a "first layer coating solution" for forming the first layer to a base material, 2) a process of forming the first layer by heating, drying, and baking the coating film, 3) a process of performing a surface improving treatment on the formed first layer, 4) a process of removing a degraded imide resin from the surface of the first layer after being subjected to the surface improving treatment, 5) a process of forming a coating film by applying a coating solution (hereinafter, also referred to as a "second layer coating solution") for forming the second layer to the surface of the first layer from which the degraded imide resin has been removed, 6) a process of forming the second layer by heating, drying, and baking the coating film, and 7) a process of separating the polyimide resin film having the first layer and the second layer from the base material.

Here, the coating solution is obtained by dissolving a resin component in a solvent, and for example, concentration of a solid content thereof is 10% by weight or more and 30% by weight or less, in the aforementioned process 1), the base material is not particularly limited, and a cylindrical base material (mold) is preferably used. Although the base material may be a metal base material, a base material made of other material such as a resin, glass, or ceramic may be used instead of the base material made of metal. In addition, a glass coating, a ceramic coating, or the like may be provided on the surface of the base material, and a peeling agent of a silicon base, a fluorine base, or the like may be applied.

In addition, examples of the coating method in the aforementioned process include ordinary methods such as a blade coating method, a wire bar coating method, a spray coating method, a dipping coating method, a bead coating method, an air knife coating method, and a curtain coating method.

In the aforementioned process 3), the method of the surface improving treatment is not particularly limited, and examples thereof includes an ultraviolet irradiation treatment, a plasma treatment, an excimer laser treatment, a frame treatment, and a corona treatment. In particular, it is desired to employ the ultraviolet irradiation treatment using a low-pressure mercury lamp or an excimer lamp, or the plasma treatment.

In the aforementioned process 6), examples of a method of removing the degraded imide resin includes a method of removing the degraded imide resin through washing. Examples of a specific washing method include wiping (also referred to as "sweeping"), dipping in which the degraded imide resin is dipped into a washing agent, a flowing washing in which the degraded imide resin is dipped into a flowing washing agent, ultrasonic washing, scrubbing, and shower washing, and wiping or ultrasonic washing is preferably employed.

Although the embodiment has been described above, the invention is not to be interpreted as being limited to the aforementioned embodiment, and various modifications, changes, and improvements may be made.

EXAMPLES

Although examples of the invention will be described below, the invention is not limited to the following examples. Also, "parts" and "%" in the following description are all on a weight basis.

<Preparation of First Layer Coating Solution>

48.6 g (that is, 27 phr) of carbon black (manufactured by Orion Engineered. Carbons; SB4; primary particle diameter: 25 nm) that serves as a conductive material is added to 1,000 g of wholly aromatic polyimide resin varnish (manufactured by Unitica Ltd.; U-imide KX; solid content rate: 18% by weight; solvent: N-methyl-2-prorrydon (NMP)), using a high-pressure collision-type dispersing machine (manufactured by Genus K. K.), the mixture is allowed to pass through a φ0.1 ram orifice at 200 MPa and the resulting two divided slurries are collided with each other, and the procedures with the high-pressure collision-type dispersing machine are repeated five times, thereby performing dispersion.

<Preparation of Second Layer Coating Solution A1>

A mixture obtained by adding 41.2 g (that is, 24 phr) of carbon black (manufactured by Orion Engineered Carbons; SB4, primary particle diameter: 25 nm) that serves as a conductive material to 1,000 g of wholly aromatic polyimide resin varnish (manufactured by Unitica Ltd.; U-imide KX; solid content rate: 18% by weight; solvent: N-methyl-2-pyrorrydone (NMP)) is allowed to pass through a φ0.1 mm orifice at 200 MPa and the resulting two divided slurries are collided with each other using a high-pressure collision-type dispersing machine (manufactured by Genus K. K.), and the procedures with the high-pressure collision-type dispersing machine are repeated five times, thereby performing dispersion. The dispersant is diluted with NMP such that the solid content rate of 10% by weight: is achieved.

<Preparation of Second Layer Coating Solution A2>

A mixture obtained by mixing 33 g (that is, 22 phr) of carbon black (manufactured by Orion Engineered Carbons; FW1; primary particle diameter: 13 nm) that serves as a conductive material to 1,000 g of wholly aromatic polyamide-imide resin varnish (manufactured by Hitachi Chemical Co., Ltd.; HPC-9000; solid content rate: 15% by weight; solvent: N-methyl-2-pyrorrydone (NMP)) is allowed to pass through a φ0.1 mm orifice at 200 MPa and the resulting two divided slurries are collided with each other using a high-pressure collision-type dispersing machine (manufactured by Genus K.K.), and the procedures with the high-pressure collision-type dispersing machine are repeated five times, thereby performing dispersion. The dispersant is diluted with NMP such that the solid content rate of 10% by weight is achieved.

<Preparation of Second Layer Coating Solution A3>

A mixture obtained by adding 33 g (that is, 22 phr) of carbon black (manufactured by Orion Engineered Carbons; FW1; primary particle diameter: 13 nm) that serves as a conductive material to 1,000 g of wholly aromatic polyamide-imide resin varnish (manufactured by Hitachi Chemical Co., Ltd.: HPC-9000; solid content rate: 15% by weight; solvent: N-methyl-2-pyrorrydone (NMP)) is allowed to pass through a φ0.1 mm orifice at 200 MPa and the resulting two divided slurries are collided with each other using a high-pressure collision-type dispersing machine (manufactured by Genus K.K.), and the procedures with the high-pressure collision-type dispersing machine are repeated five times, thereby performing dispersion.

<Preparation of Second Layer Coating Solution A4>

A mixture obtained by adding 43.2 g (that is, 24 phr) of carbon black (manufactured by Orion Engineered Carbons; SB4; primary particle diameter: 25 nm) that serves as a conductive material to 1,000 g of wholly aromatic polyimide resin varnish (manufactured by Unitica Ltd.; U-imide KX; solid content rate: 18% by weight; solvent: N-methyl-2-pyrorrydone (NMP)) is allowed to pass through a φ0.1 mm orifice at 200 MPa and two divided slurries are collided with each other using a high-pressure collision-type dispersing machine (manufactured by Genus K. K.), and the procedures with the high-pressure collision-type dispersing machine, and the procedures with the high-pressure collision-type dispersing machine are repeated five times, thereby performing dispersion.

Example 1.1

—Formation of First Layer—

The first layer coating solution is applied onto an outer surface of a φ278 mm pipe made of aluminum according to a flow coating method such that the film thickness is 75 μm and the resultant is dried at 150° C. for 30 minutes while being rotated (also referred to as a "drying process"). Thereafter, the obtained product is heated in an oven at 340° C. for 1 hour (also referred to as, a "baking process") and then taken out, thereby obtaining a pipe made of aluminum with the polyimide resin film applied to and formed on the outer surface thereof.

(Surface Improving Treatment)

The pipe made of aluminum with the polyimide resin film applied to and formed on the outer surface thereof is placed in an ultraviolet irradiation device (manufactured by Sen Engineering Co., Ltd.) that incorporates a low-pressure mercury lamp therein, the distance between the lamp and the film surface applied to the pipe made of aluminum is set to 10 mm, and a UV treatment is performed thereon for 5 minutes under a condition of irradiation intensity of 17 mW/cm$^2$ while the product is rotated.

(Washing Treatment)

A clean room wiper (manufactured by Dainichi Trading Co., Ltd.; TechniCloth TX604) is allowed to contain pure water, and the surface of the first layer subjected to the surface treatment is wiped with the wiper, while exchanging a stained wiper with a new wiper, until the wiper is not stained.

—Formation of Second Layer—

The second layer coating solution A1 is applied to the surface of the pipe made of aluminum with the first layer applied to and formed on the outer surface thereof such that the film thickness is 5 μm and is dried at 150° C. for 30 minutes while being rotated (also referred to as a "drying process"). Thereafter, the obtained product is heated in an oven at 340° C. for 1 hour (also referred to as a "baking process") and is then taken out, thereby obtaining a pipe made of aluminum with a two-layer polyimide resin applied to and formed on the outer surface thereof.

—Production of Endless Belt for Evaluation—

The two-layer polyimide resin applied to and formed on the outer surface is removed from the pipe made of aluminum and is then cut to have a width of 363 nm, thereby obtaining an endless belt made of the polyimide resin film including the first layer and the second layer. As illustrated in Table 1, a thickness ratio (second layer/first layer) of the second layer to the first layer in the endless belt is 5/75.

Examples 2 to 13 and Comparative Examples 1 to 6

Endless belts are obtained in the same manner as in Example 1 except that production conditions are changed in accordance with Table 1. However, in a case in which the second layer coating solution A2 or A3 is used instead of the second layer coating solution A1, the conditions of the heating process for forming the second layer are changed to conditions that the products are heated in an oven at 260° C. for 1 hour. Also, the baking process at the time of forming the first layer is not performed, and the processes up to the drying process in which the products are dried at 150° C. for 30 minutes while being rotated are performed, in Comparative Examples 3 and 6. Also, for the first layer surface treatment, an ultraviolet irradiation device that incorporates an excimer lamp therein (manufactured by M. D. Com, Inc.) is used in Examples 7 and 8, and a plasma surface improving device (manufactured by Diener) is used in Examples 9 and 10. Also, the description "Not possible" for Comparative Examples 3 and 6 in Table 1 represents that the surface treatment and the washing process are not able to be performed on the first layer since the first layer is not formed, that is, a single layer is formed only by the second layer coating solution in Comparative Examples 3 and 6, <Evaluation>

The endless belts (that is, the belts made of the polyimide resin films) in the respective examples are evaluated as follows. The results are shown in Table 1.

[Adhesiveness Between Layers]

(Initial stage): The respective samples are subjected to crosscut test in accordance with JIS K 5600-5-6 (1999), and adhesiveness between the first layer and the second layer is categorized by the following criteria. Also, the cutting interval is set to 1 mm.

(After running): A jig in which only a transfer unit portion of Apeosport C3375 manufactured by Fuji Xerox Co., Ltd, may be rotated is produced. The obtained cylindrical film is attached to the jig and is rotated at 300 Kcycle, a crosscut test is then conducted in accordance with JIS K 5600-5-6 (1999), and adhesiveness between the first layer and the second layer is categorized by the following criteria. Also, the cutting; interval is set to 1 mm.

Category 0: a cutting, edge is completely smooth, and no peeling is observed from any grid.

Category 1: a small peeling is observed in a coating film at a cutting intersection, proportion at which the crosscut portion is affected does not exceed 5% explicitly.

Category 2: The coating film has peeled off along the cutting edge and/or at the intersection. Although the proportion at which the crosscut portion is affected explicitly exceeds 5%, the proportion does not exceed 15%.

Category 3: remarkable peeling of the coating film has partially or entirely occurred along the cutting edge, and/or various portions of the grid have partially or entirely peeled. Although the proportion at which the crosscut portion is affected explicitly exceeds 15%, the proportion does not exceed 35%.

Category 4: remarkable peeling of the coating film has partially or entirely occurred, along the cut edge, and/or several grids have partially or entirely peeled off. Although the proportion at which the crosscut portion is affected explicitly exceeds 35%, the proportion does not exceed 65%.

Category 5: a case in which the degree of peeling exceeds the category 4.

[Inner Surface Resistance and Inner Surface Resistance Variation]

An inner surface resistance of the obtained endless belt in each example is obtained by measuring, using a double-cylinder probe with an inner cylinder of $\phi 16$ mm and an outer cylinder of $\phi 30$ mm×$\phi 40$ mm and a measurement device with a lower surface made of an insulating member, an amount of current (a value in 10 seconds after application of a voltage) flowing through the inner cylinder when 100 V is applied to the outer cylinder of the device, and performing calculation based on the measured amount. For an inner surface resistance variation, the inner surface resistances of each endless belt are measured at twenty four locations by the aforementioned method, and a difference between the maximum value and the minimum value of common logarithms at the respective points is assumed to be a resistance variation value.

[Bond Composition Ratio of a Sum of C—N Bond and C—O Bond]

A bond composition rink) of a SUM of a C—N bond and a C—O bond to bonds of all C elements that are present in the surface of the first layer is measured using a photoelectron spectrometer (manufactured by JEOL Ltd., JPS-9000MX), As measurement conditions, an MgKα ray is used as an X-ray source, an acceleration voltage is set to 10 kV, and an emission current is set to 10 mA, in the surface of the first layer at the interface between the first layer and the second layer in each example, narrow scanning and peak separation of a CIS peak are performed, and the bond composition ratio (atm %) of a sum of the C—N bond and the C—O bond to the bonds of all the C elements that are present in the surface of the first layer is measured,

[Secondary Transfer Efficiency]

Secondary transfer efficiency is obtained by the following method while applying the obtained endless belt in each example as an intermediate transfer member to an image forming apparatus. In an environment of 55% RH at 22° C., an image of K 60% with a size of 10 mm×50 mm is formed on the intermediate transfer member and is then transferred to a sheet, the machine is stopped before fixation, the amount of toner transferred to the sheet and the amount of toner remaining on the intermediate transfer member are measured, transfer efficiency is obtained from the equation represented below, and evaluation is performed according to the following criteria.

Transfer efficiency (%)=(amount of toner that has been transferred to sheet)÷(amount of toner that has been transferred to sheet+amount of toner that remains on intermediate transfer member)×100

A: 95% or more

B: 92.5% or more and less than 95%

C: 90% or more and less than 92.5%

D: less than 90%

TABLE 1

| | | Example | | | | | | |
|---|---|---|---|---|---|---|---|---|
| | | 1 | 2 | 3 | 4 | 5 | 6 | 7 |
| First layer | Ultraviolet irradiation treatment (low-pressure mercury lamp) | 5 min | 10 min | 20 min | 5 min | 10 min | 20 min | — |
| | Ultraviolet irradiation treatment (excimer lamp) | — | — | — | — | — | — | 5 min |
| | Plasma treatment | — | — | — | — | — | — | — |
| | Washing | Yes | Yes | Yes | Yes | Yes | Yes | Yes |
| Second layer | Coating solution No. | A1 | A1 | A1 | A2 | A2 | A2 | A1 |
| Thickness ratio (second layer/first layer) | | 5/75 | 5/75 | 5/75 | 5/75 | 5/75 | 5/75 | 5/75 |
| C—O/C—N bond composition ratio (atm %) | | 4.1 | 4.7 | 5.5 | 4.1 | 4.7 | 5.5 | 4.7 |
| Adhesiveness | Initial stage | 0 | 0 | 0 | 2 | 1 | 0 | 0 |
| | After running | 2 | 1 | 0 | 3 | 2 | 1 | 1 |
| Inner surface resistance (log (Ω/sq.)) | | 12 | 11.9 | 12.1 | 12.1 | 12.1 | 12.1 | 11.9 |
| Inner surface resistance variation (log (Ω/sq.) | | 0.22 | 0.25 | 0.19 | 0.23 | 0.21 | 0.25 | 0.25 |
| Secondary transfer efficiency (%) | | 93 (B) | 93 (B) | 93 (B) | 96 (A) | 96 (A) | 96 (A) | 93 (B) |

| | | Example | | | | | |
|---|---|---|---|---|---|---|---|
| | | 8 | 9 | 10 | 11 | 12 | 13 |
| First layer | Ultraviolet irradiation treatment (low-pressure mercury lamp) | — | — | — | 5 min | 5 min | 5 min |
| | Ultraviolet irradiation treatment (excimer lamp) | 10 min | — | — | — | — | — |
| | Plasma treatment | — | 5 min | 10 min | — | — | — |
| | Washing | Yes | Yes | Yes | Yes | Yes | Yes |
| Second layer | Coating solution No. | A1 | A1 | A1 | A3 | A3 | A3 |
| Thickness ratio (second layer/first layer) | | 5/75 | 5/75 | 5/75 | 40/60 | 50/50 | 60/40 |
| C—O/C—N bond composition ratio (atm %) | | 5.5 | 4.7 | 5.5 | 4.1 | 4.1 | 4.1 |
| Adhesiveness | Initial stage | 0 | 0 | 0 | 2 | 2 | 2 |
| | After running | 0 | 1 | 0 | 2.5 | 2 | 2.5 |
| Inner surface resistance (log (Ω/sq.)) | | 12.1 | 11.9 | 12.1 | 12.1 | 12.1 | 12.1 |
| Inner surface resistance variation (log (Ω/sq.) | | 0.19 | 0.25 | 0.19 | 0.23 | 0.23 | 0.23 |
| Secondary transfer efficiency (%) | | 93 (B) | 93 (B) | 93 (B) | 96 (A) | 96 (A) | 96 (A) |

| | | Comparative Example | | | | | |
|---|---|---|---|---|---|---|---|
| | | 1 | 2 | 3 | 4 | 5 | 6 |
| First layer | Ultraviolet irradiation treatment (low-pressure mercury lamp) | — | 20 min | Not possible | — | 20 min | Not possible |
| | Ultraviolet irradiation treatment (excimer lamp) | — | — | Not possible | — | — | Not possible |
| | Plasma treatment | — | — | Not possible | — | — | Not possible |
| | Washing | Yes | No | Not possible | Yes | No | Not possible |
| Second layer | Coating solution No. | A1 | A1 | A4 | A2 | A2 | A3 |
| Thickness ratio (second layer/first layer) | | 5/75 | 5/75 | 100/0 | 5/75 | 5/75 | 100/0 |
| C—O/C—N bond composition ratio (atm %) | | 1.9 | 3.2 | — | 1.9 | 3.2 | — |
| Adhesiveness | Initial stage | 3 | 5 | — | 5 | 5 | — |
| | After running | 5 | 5 | — | 5 | 5 | — |
| Inner surface resistance (log (Ω/sq.)) | | 12 | 12 | 9.7 | 12.1 | 12.1 | 8.4 |
| Inner surface resistance variation (log (Ω/sq.) | | 0.2 | 0.22 | 0.79 | 0.21 | 0.22 | 0.85 |
| Secondary transfer efficiency (%) | | 93 (B) | 93 (B) | Transfer not possible | 96 (A) | 96 (A) | Transfer not possible |

It may be understood from Table 1 that the polyimide resin films in the examples have more excellent adhesiveness of the second layer to the first layer than the polyimide resin films in the comparative examples. Also, it may be understood that no practical problems occur in a case in which the endless belts made of the polyimide resin films in the examples are applied to intermediate transfer bodies.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An endless belt, comprising:
   a polyimide resin film comprising:
   a first layer that contains an imide resin, a bond composition ratio of a sum of a C—N bond and a C—O bond to bonds of all C elements that are present in a surface of the first layer being 4 atm % or more; and
   a second layer that is provided on the surface of the first layer.

2. The endless belt according to claim 1, which is an intermediate transfer belt.

3. The endless belt according to claim 1, wherein the second layer is a resin layer that contains an imide resin or an inorganic layer.

4. The endless belt according to claim 1, wherein the second layer is an inorganic layer.

5. The endless belt according to claim 1, wherein the second layer is a resin layer that contains a polyamide-imide resin.

6. The endless belt according to claim 1, wherein a ratio between a thickness of the first layer and a thickness of the second layer is 40:60 to 60:40.

7. An image forming apparatus comprising:
the endless belt according to claim 1.

* * * * *